United States Patent [19]

Frese et al.

[11] 4,368,291

[45] Jan. 11, 1983

[54] PROCESS FOR THE MULTI-STAGE POLYMERIZATION OF ETHENE

[75] Inventors: Albert Frese; Fritz Baxmann, both of Marl, Fed. Rep. of Germany

[73] Assignee: Chemische Werke Huels, A.G., Marl, Fed. Rep. of Germany

[21] Appl. No.: 6,814

[22] Filed: Jan. 26, 1979

[30] Foreign Application Priority Data

Jan. 26, 1978 [DE] Fed. Rep. of Germany ....... 2803281

[51] Int. Cl.³ .......................... C08F 2/34; C08F 10/02
[52] U.S. Cl. ........................................ 525/53; 526/65; 526/348.6; 526/352; 526/901
[58] Field of Search .......................... 526/65, 901, 352; 525/53

[56] References Cited

U.S. PATENT DOCUMENTS 3,074,922  1/1963  Dye et al. ............................. 526/65
3,392,213  7/1968  Berger .................................. 526/65
4,012,573  3/1977  Trieschmann et al. ................ 526/88
4,187,278  2/1980  Clifford ................................ 526/65

FOREIGN PATENT DOCUMENTS 1064718  9/1959  Fed. Rep. of Germany .
1099168  2/1961  Fed. Rep. of Germany .
 791889  3/1958  United Kingdom .
1110566  4/1968  United Kingdom ................ 526/901
1188336  4/1970  United Kingdom ................ 526/116

Primary Examiner—Edward J. Smith
Attorney, Agent, or Firm—Millen & White

[57] ABSTRACT

In a low pressure process for polymerizing ethene using a Ziegler mixed catalyst comprising (a) a titanium compound, a vanadium compound or a mixture thereof and (b) an aluminum-organic compound or a mixture thereof, an improvement is provided wherein the process is carried out in multi-stages comprising:
 polymerizing, in a first polymerization stage, in the liquid phase in a dispersion medium of a $C_3$- to $C_6$-hydrocarbon, and
 polymerizing, in a last polymerization stage, in the gas phase.

11 Claims, No Drawings

PROCESS FOR THE MULTI-STAGE POLYMERIZATION OF ETHENE

BACKGROUND OF THE INVENTION

Ethene can be polymerized in the gas phase or in the liquid phase. Both processes have advantages and also disadvantages.

The gas phase polymerization has the advantage that only small amounts of a dispersion medium, if any, are required. However, it has the disadvantage that maintaining a constant polymerization temperature over the entire reaction space is substantially more difficult and that part of the polyethene obtained is produced in the form of agglomerates. Furthermore, the polymerization partially takes place directly at the walls of the apparatus. This material caked to the wall partially detaches from it during the polymerization and, thus, passes in the form of lumps and small flat blocks into the normal polyethene powder. These polyethene agglomerates cause blockages of the apparatus and contaminate the polyethene powder; in the finished article, they cause discolorations and specks. Furthermore, in such gas phase polymerizations, uniform distribution of the mixed catalyst is difficult. Equally deleteriously, the control of molecular weight, the manufacture of polyethene of low molecular weight and, especially, the manufacture of polyethene of high density are all very difficult or impossible. Furthermore, the polyethene obtained in the gas phase polymerization has a relatively low bulk density.

It is true that polymerization in the liquid phase does not suffer from such disadvantages, but, on the other hand, it requires use of large amounts of dispersion media. Furthermore, the liquid phase polymerization can only be carried out for as long as the suspension can be stirred. When ethene is added as a gas, the rate of polymerization in general decreases continuously as the stirrability of the polyethene dispersion decreases. Finally, when the stirrability is very low, polymerization is no longer detectable. This termination of polymerization in general occurs at solids contents of about 200 to 300 g of polyethene/liter of suspension, depending on the bulk density of the polyethene. For these reasons, polymerization in the liquid phase can in general only be carried out to solids contents of about 200 to 300 g/l of suspension. This not only requires the use of large amounts of dispersion media and catalysts, and correspondingly high costs for these, but also entails high contents of catalysts in the polyethene obtained. Therefore, an expensive working-up is required to substantially remove these catalysts.

SUMMARY OF THE INVENTION

Accordingly, it is an object of this invention to provide a process which permits ethene to be polymerized in a simple and economical manner.

Upon further study of the specification and appended claims, further objects and advantages of this invention will become apparent to those skilled in the art.

These objects have been achieved by providing in a low pressure process for polymerizing ethene using a Ziegler mixed catalyst comprising (a) a titanium compound, a vanadium compound or a mixture thereof and (b) an aluminum-organic compound or a mixture thereof, the improvement wherein the process is carried out in multi-stages comprising:

polymerizing, in a first polymerization stage, in the liquid phase in a dispersion medium of a $C_3$- to $C_6$-hydrocarbon and polymerizing, in a last polymerization stage, in the gas phase.

DETAILED DISCUSSION

By combining, according to this invention, ethene polymerization in the liquid phase in a first polymerization stage with ethene polymerization in the gas phase in a last polymerization stage, it is possible, surprisingly, to avoid the difficulties and disadvantages of both conventional types of polymerization processes in a simple manner.

Preferably, the catalyst is added only in the first polymerization stage. Such an addition presents no difficulties at that stage. Surprisingly, however, the further addition of catalyst in the remaining polymerization stages, for example, in a gas phase stage, and the uniform distribution of the catalysts are also possible without difficulty. As a result of such a stepwise addition of the catalysts, especially the addition of different mixed catalysts, in the individual polymerization stages, it is possible, for example, to manufacture polyethenes having a particular molecular weight distribution, as well as to manufacture polymers with different densities.

By adding various olefins in the individual polymerization stages, it is possible to manufacture block copolymers, for example, ethene/propene/1-butene block copolymers. Of course, random copolymers of lower crystallinity can also be manufactured, for example, random ethene/1-butene copolymers which have properties resembling those of high pressure polyethene; but any desired higher molecular weights can also be produced. By regulating the molecular weight differently in the individual polymerization stages, for example, as is conventional, with hydrogen, polymers with a precisely predetermined molecular weight distribution can be obtained.

Such control of molecular weight, density, block structure, molecular weight distribution, etc., can be achieved using fully conventional considerations within the requirements of this invention. Such conventional considerations, as well as other details of the individual polyethene liquid and gas phase reactions involved herein, all of which are fully conventional unless otherwise indicated herein, are disclosed for example in Kunststoff-Handbuch, Vol. IV Polyolefine, Carl Hanser Verlag Munich, (1969), whose disclosure is incorporated by reference herein.

It was particularly surprising that neither agglomerates, nor caking to the wall, result during the gas phase polymerization in the last polymerization stage. Rather, a polyolefin powder which is very free-flowing and has a high bulk density is obtained. The adjustment of the molecular weight, which is difficult for gas phase polymerization, especially when manufacturing polyolefins of low molecular weights, and the manufacture of polyolefins of high density are possible in a simple manner, without difficulties, using the process according to this invention. The rate of polymerization of ethene added as a gas does not decrease, as it does when polymerizing only in the liquid phase.

Optionally, polymerization can additionally be carried out in one or more further intermediate polymerization stages between the first and the last polymerization stage. In these additional polymerization stages, the polymerization can be continued in the liquid phase and then switched to the gas phase in the latter such stages or in the last stage; or can also be carried out in the gas phase throughout.

In the first polymerization stage or stages, the heat of polymerization is removed by circulatory gas cooling, evaporative cooling and/or jacket cooling. Such cooling techniques are conventional (Ullmanns Encyklopädie der technischen Chemie, 3, Aufl., Vol. 1 (1951), page 241-246, 255 and 256; Kunststoff-Handbuch, Vol. IV, Polyolefine, Carl Hanser Verlag Munich, (1969) page 79). Preferably, the heat of polymerization is removed by evaporative cooling. In the last polymerization stage, the residual dispersion medium is evaporated with the aid of the heat of polymerization which is removed from the reaction space. The dispersion medium which is removed, possibly together with the unconverted olefins, can, when the polymerization temperature rises in the last polymerization stage, be completely or partially recycled to this polymerization stage, after cooling, with or without condensation or partial condensation. Preferably, the dispersion medium is very largely evaporated in this last polymerization stage.

A free-flowing polyethene of high bulk density is obtained, which retains only very small amounts of gaseous or adsorbed dispersion medium. A brief treatment with gases, especially inert gases such as nitrogen and/or superheated steam, gives a polyethene completely freed from residual dispersion medium. The treatment with superheated steam has the advantage that it also inactivates catalyst residues which are present.

Preferably, stirred kettles are used as polymerization reactors in the first polymerization stage. In the additional polymerization stages, between the first and the last polymerization stage, stirred kettles are also preferably used where suspensions which are still stirrable are involved. At higher solids contents, mixers, for example, are suitable. In the last polymerization stage, the polymerization can also be carried out in a mixer. Preferably, however, the polymerization in the last stage is carried out in a fluidized bed. Such conventional polymerization vessels are described in Ullmanns Encyklopädie der technischen Chemie, 3. Aufl., Vol. 1 (1951) page 602, 713-717, 750-754, 916-933 and Kunststoff-Handbuch, Vol. IV, page 79.

The polymerization of the ethene and the optional olefin comonomers is carried out using Ziegler catalysts as is conventional. Ethene can be added in each polymerization stage. In general, the polymerization is carried out at temperatures of up to about 100° C., preferably at 40° to 90° C., especially at 70° to 85° C., and at pressures of up to about 30 bars, preferably 5-20 bars. The polymerization can be carried out at different temperatures and different pressures in the individual polymerization stages in accordance with the previously mentioned considerations as to end product and conventional process requirements. The polymerization can be carried out continuously or discontinuously, but the former is preferred.

Suitable comonomers include α-olefins such as propene, 1-butene and 1-hexene. Preferably, 1-butene is employed. Suitable dispersion media include propane, n-butene, iso-butane, 2-butene, pentanes and hexanes as well as mixtures of these. 2-Butene has the advantages as a dispersion medium that it accelerates the polymerization, and also the copolymerization, of the olefins. In general, the 2-butene does not undergo polymerization. Only in the presence of special catalysts, such as the mixed catalyst of $TiCl_3 \cdot n\, AlCl_3$ ($n=0.2$ to $0.6$) and aluminum-isoprenyl are copolymers of the 1-olefins with 2-butene obtained. The aliphatic dispersion media such as propane, n-butane, iso-butane and the pentanes and hexanes are completely inert to all Ziegler catalysts. Amongst these dispersion media, n-butane and iso-butane are preferred. They have the advantage that relatively low pressures are required and that they can easily be removed in the last polymerization stage by means of the heat of polymerization.

Suitable mixed catalysts contain titanium compounds and vanadium compounds, as well as mixtures of these, and aluminum-organic compounds. Examples of suitable compounds of titanium and vanadium include titanium halides, especially $TiCl_4$, $TiCl_3$ and $TiCl_3 \cdot n\, AlCl_3$ ($n=0.2$ to $0.6$); orthotitanic acid esters such as tetrabutyl titanate and tetrapropyl titanate; halogenoorthotitanic acid esters, such as $Ti(OR)_3Cl$ and $Ti(OR)_2Cl_2$; vanadium halides, especially $VOCl_3$ and $VCl_4$; and vanadic acid esters, such as $VO(OR)_3$. Mixtures of these compounds, especially mixtures of $Ti(OR)_4$ with $VOCl_3$, or of $TiCl_4$ and/or $Ti(OR)_4$ with $VO(OR)_3$, are also suitable. These transition metal compounds can be activated with additives such as electron donors and can furthermore be precipitated on inorganic carriers such as MgO, $Mg(OH)_2$, MgClOH, $MgCl_2$, $Ca(OH)_2$ or their mixtures. Examples of suitable aluminum-organic compounds include aluminum trialkyls such as aluminum triethyl, aluminum tripropyl, aluminum tri-n-butyl, aluminum triisobutyl and aluminum tri-n-octyl, as well as polymeric aluminum alkyls, such as, for example, aluminum isoprenyl. Commercial aluminum isoprenyl contains isobutyl groups in addition to the isoprenyl groups. Aluminum alkyl hydrides, such as diisobutyl-aluminum hydride, are also suitable, as are alkyl-aluminum halides, such as diethyl-aluminum chloride, ethyl-aluminum dichloride, the equimolecular mixture of diethyl-aluminum chloride and ethyl-aluminum dichloride referred to as ethyl-aluminum sesquichloride, and alkyl- and dialkyl-aluminum iodides and bromides. Mixtures of different aluminum-organic compounds are also suitable. The aluminum alkyls can be converted to the corresponding alkyl-aluminum halides by addition of hydrogen and/or of aluminum halides. This is of interest if it is desired to carry out the polymerization, in a subsequent polymerization stage, with the aid of aluminum-organic compounds which contain halogen, or are richer in halogen ($Al(C_2H_5)_3 + HCl \rightarrow Al(C_2H_5)_2Cl + C_2H_6$) (See Example 2).

The transition metal compounds can be employed as non-reduced compounds or as pre-reduced compounds. The pre-reduction is preferably carried out with aluminum-organic compounds. (see Kunststoff-Handbuch, Vol. IV, Polyolefine, Carl Hanser Verlag Munich (1969) page 97).

Preferably, all of the catalyst is added in the first polymerization stage. However, further catalysts, or components of the mixed catalyst, can be added in each of the subsequent polymerization stages. It is also possible to add different catalysts or components of the mixed catalyst in the subsequent polymerization stages, or to vary the catalysts or components of the mixed catalysts by reactions in the subsequent polymerization stage or stages. In this way, for example, the preselected molecular weights and distributions, block structures, densities, etc. can be achieved.

The relative amounts of catalysts and reactants, times of reaction for each stage, stirring characteristics, flow rates, residence times, conversions, etc. of the overall process and/or of each stage may be selected in accordance with conventional considerations, and in light of the properties of the finally desired products as mentioned above.

In the first polymerization stage the polymerization is carried out to a catalytic yield of at least 25 kg polyethene/g Ti- and/or V-catalyst (examples 1, 3, 4 and 5: 61 kg polyethene/g Ti- and V-catalyst; example 2: 25.4 kg polyethene/g TiCl$_3$). The polyethene suspension, obtained in the first polymerization stage is introduced in the following polymerization stage or stages without separation of the liquid phase.

Without limiting this invention in any way, it is theorized that the superior results obtained by this invention are due at least in part to the use, as a starting material in the gas phase step, of the polymer-containing dispersion media resulting from the previous liquid phase step. Since this dispersion media is vaporized during the gas phase step, it appears that a cooling effect is involved. Consequently, other equivalent dispersion media may also be employed as a dispersant for the polymeric starting material which is added to the gas phase polymerization stage used during the preparation of a homo- or copolymer of ethene. Such contemplated equivalents include inert hydrocarbons. In general, the solids content of these polymer-containing dispersing media is 300–700 g/l.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The polymerization is carried out in a pressure-resistant 0.25 m$^3$ stirred kettle with level regulation, jacket cooling and circulatory gas cooling, in a downstream 2 m$^3$ reactor with a mixing stirrer, and thereafter in a fluidized bed having a reaction space of 2 m$^3$.

Per hour, 100 kg of a C$_4$-cut which contains 40.6% of n-butane, 39.6% of trans-2-butene and 19.8% of cis-2-butene are introduced by means of a pump into the 0.25 m$^3$ polymerization kettle. Per hour, 2.0 g of a titanium-vanadium catalyst (obtained by reducing a mixture of 1 mol of TiCl$_4$, 1 mol of VOCl$_3$ and 1 mol of VO(OC$_3$H$_7$) with a mixture of 1 mol of Al(C$_2$H$_5$)$_2$Cl and 0.2 mol of Al(C$_2$H$_5$)I in 20 percent hexane solution or dispersion at 0° C., and subsequently isolating the product), are metered into the butane/2-butene stream. Separately therefrom, 20 g per hour of Al(i-C$_4$H$_9$)$_3$ are introduced into the C$_4$-cut. 400 l (S.T.P.) of hydrogen are introduced per hour into the polymerization kettle. Ethene is introduced up to a pressure of 20 bar, and the pressure is maintained at this value by further introduction of ethene. The polymerization temperature is kept at 85° C. by jacket cooling and circulatory gas cooling. The polyethene suspension obtained in this polymerization kettle is introduced continuously, through a bottom slide valve regulated by the level in the kettle, into a horizontal 2 m$^3$ reactor having a mixing stirrer. The suspension contains 55 kg of polyethene in 45 kg of the C$_4$-cut. The horizontal 2 m$^3$ reactor is equipped with circulatory gas cooling and with a cooling jacket. This keeps the polymerization temperature at 80° C. Per hour, 750 l (S.T.P.) of hydrogen are introduced into the reactor. Ethene is added up to a pressure of 15 bar, and the pressure is kept at this value by adding further ethene. In this reactor, the solids content rises to 76 kg of polyethene in 24 kg of the C$_4$-cut. This free-flowing polymer is introduced continuously, via a pressure lock, into a fluidized bed having a reaction space of 2 m$^3$, in which polyethene is fluidized by means of ethene which is cooled to 25° C., and kept moving, in a circuit which includes a cooler. The polymerization is continued at 80° C. under a pressure of 12 bar. Per hour, 750 l (S.T.P.) of hydrogen are added to the circulating gas. The C$_4$-hydrocarbons which partially condense in the cooler are separated off. The polyethene, which has a residual wetness content of 3%, is discharged through a lock into a fluidization box in which the residual amount of hydrocarbon is removed under normal pressure by means of nitrogen to which superheated steam at 120° C. is added. Per hour, 370 kg of a free-flowing polyethene having the following properties are obtained:

| Viscosity number J | 290 cm$^3$/g | (DIN 53 728) |
| --- | --- | --- |
| MF$_{190/5}$ | 1.1 g/10 min | (DIN 53 735) |
| Density | 0.958 g/cm$^3$ | (DIN 53 479) |
| Yield stress | 29 N/mm$^2$ | (DIN 53 371) |
| Tensile strength | 41 N/mm$^2$ | (DIN 53 371) |
| Elongation at break | 970% | (DIN 53 371) |
| Bulk density | 448 g/l | (DIN 53 468) |
| Ash content | 0.01% | |

The moldings produced from this polyethene are colorless and free from specks.

COMPARATIVE EXAMPLE 1a

The polymerization is carried out in accordance with Example 1, in two 0.25 m$^3$ polymerization kettles connected in series and equipped with jacket cooling and circulatory gas cooling. The polyethene suspension obtained in the first polymerization kettle is introduced continuously, through a bottom slide valve regulated by the level in the kettle, into the second 0.25 m$^3$ polymerization kettle into which, in addition, 200 l (S.T.P.) of hydrogen are introduced per hour. Ethene is added up to a pressure of 16 bar. The polymerization temperature cannot be maintained even by means of the higher ethene pressure, and drops. The ethene ceases to polymerize. The suspension in the polymerization kettle is no longer stirrable. The product contained in the kettle can no longer be conveyed out of the reaction without dilution. The suspension contains agglomerates.

COMPARATIVE EXAMPLE 1b

The polymerization is carried out in the fluidized bed employed in Example 1, into which 50 kg of dry polyethene pretreated with nitrogen are initially introduced. This polyethene is fluidized with ethene which is cooled, and kept moving, in a circuit comprising a cooler. 20 g of Al(i-C$_4$H$_9$)$_3$ are added to the circulating gas via a vaporizer. Thereafter, 20 g of Al(i-C$_4$H$_9$)$_3$ and 750 l (S.T.P.) of hydrogen are metered hourly into the circulating gas via the evaporator. A suspension, in hexane, of 2.0 g of the titanium-vanadium catalyst employed in Example 1 are sprayed onto the fluidized polyethene and thereafter 2.0 g of this catalyst are metered hourly into the hexane suspension. The polymerization is carried out at 80° C. and at a pressure of 12 bar. This pressure is obtained by adding ethene to the circulating gas, and is kept constant by further addition of ethene. The polymerization temperature of 80° C. is maintained by cooling the circulating gas to 20° C. The polyethene is transferred via a lock into a fluidization box in which the residual amount of hydrocarbon is removed under normal pressure by means of nitrogen to which superheated steam at 120° C. is added. Per hour, 78 kg of a polyethene consisting of a powder with agglomerates in the form of lumps and small flat blocks are obtained. After discharging the batch, caked material remains on the walls of the apparatus. The polyethene obtained has the following properties:

| Viscosity number J | 650 cm$^3$/g |
|---|---|
| MF$_{190/5}$ | <0.1 g/10 min |
| Density | 0.949 g/cm$^3$ |
| Yield stress | 21 N/mm$^2$ |
| Tensile strength | 40 N/mm$^2$ |
| Elongation at break | 610% |
| Bulk density (powder constituent only) | 305 g/l |
| Ash content | 0.05% |

The finished articles produced from this polyethene are discolored and contain specks.

EXAMPLE 2

The polymerization is carried out in the apparatus described in Example 1. Per hour, 100 kg of n-butane are introduced into the 0.25 m$^3$ polymerization kettle via a pump. 5.0 g per hour of a TiCl$_3$.0.5 AlCl$_3$ catalyst (obtained by reducing 1 mol of TiCl$_4$ with 0.7 mol of Al(C$_2$H$_5$)$_3$Cl$_3$ (as a 20 percent strength solution in hexane) at 0° C. using a reaction time of 6 hours, and a post-reaction time of 6 hours at 0° to 10° C., heating at 130° C. (6 hours) and subsequent isolation), are metered into the stream of n-butane. Separately therefrom, 17 g of Al(C$_2$H$_5$)$_3$ are introduced into the n-butane per hour. 600 l (S.T.P.) of hydrogen are introduced per hour into the polymerization kettle. Ethene is added until the pressure is 20 bars, and this value is maintained by further addition of ethene. The polymerization temperature is kept at 85° C. by jacket cooling and circulatory gas cooling. The polyethene suspension obtained in this polymerization kettle is introduced continuously, through a slide valve regulated by the level in the kettle, into a horizontal 2 m$^3$ reactor equipped with a mixing stirrer. The suspension contains 54 kg of polyethene in 46 kg of n-butane. The reactor is equipped with jacket cooling and circulatory gas cooling. By these means, the polymerization temperature is kept at 80° C. Per hour, 50 l (S.T.P.) of hydrogen, 3.3 l (S.T.P.) of hydrogen chloride, 50 kg of propene, 5 g of TiCl$_3$.0.5 AlCl$_3$ (in 50 g of n-butane) and 5 g of Al(C$_2$H$_5$)$_2$Cl are introduced into the reactor. The solids content in this reactor rises to 61 kg of polyolefin in 39 kg of the dispersion medium. This free-flowing powder is introduced continuously, through a pressure lock, into a fluidized bed having a reaction space of 2 m$^3$, in which the polyolefin is fluidized by means of 1-butene, the as yet unpolymerized propene and the n-butane, these constituents being cooled to 25° C., and circulated, in a circuit comprising a cooler. The polymerization is continued at 75° C. under a pressure of 7 bar. Per hour, 5 g of Al(C$_2$H$_5$)$_2$Cl and 50 l (S.T.P.) of hydrogen are introduced into the circulating gas through a vaporizer. Per hour, a suspension of 10.0 g of TiCl$_3$.0.5 AlCl$_3$ in 50 g of n-butane is added to the fluidized polyolefin. The pressure of 7 bar is maintained by adding 1-butene. The hydrocarbons which have partially condensed in the cooler of the circuit are separated off. The remaining volatile hydrocarbons are removed as described in Example 1. Per hour, 184 kg of an ethene/propene/1-butene block copolymer are obtained; this copolymer comprises a polyethene block, a polypropene block and a block of a propene/1-butene copolymer and has the following properties:

| Viscosity number J | 340 cm$^3$/g |
|---|---|
| MF$_{190/5}$ | 2.7 g/10 min |
| Yield stress | 31 N/mm$^2$ |
| Tensile strength | 36 N/mm$^2$ |
| Elongation at break | 564% |
| Ash content | 0.01% |

EXAMPLE 3

The polymerization is carried out as described in Example 1, but in 100 kg of a C$_4$-cut which contains 42.8% of n-butane, 34.4% of trans-2-butene, 17.1% of cis-2-butene and 5.7% of 1-butene, in place of the C$_4$-cut employed in Example 1. Per hour, 372 kg of a free-flowing random ethene/1-butene copolymer having the following properties are obtained:

| Viscosity number J | 320 cm$^3$/g |
|---|---|
| MF$_{190/5}$ | 1.0 g/10 min |
| Density | 0.9310 g/cm$^3$ |
| Yield stress | 16 N/mm$^2$ |
| Tensile strength | 35 N/mm$^2$ |
| Elongation at break | 527% |
| Bulk density | 406 g/l |
| Ash content | 0.01% |
| IR analysis: CH$_3$/100 C | 0.98 |

If the polymerization is carried out in accordance with the instructions of this example, but without the addition of hydrogen, a very high molecular random ethene/1-butene copolymer having the following properties is obtained:

| Viscosity number J | 1,570 cm$^3$/g |
|---|---|
| MF$_{190/5}$ | not measurable |
| Density | 0.9226 g/cm$^3$ |
| Yield stress | 15 N/mm$^2$ |
| Tensile strength | 36 N/mm$^2$ |
| Elongation at break | 482% |
| Impact strength | >1500 kJ/m$^2$ |
| Bulk density | 402 g/l |

EXAMPLE 4

The polymerization is carried out as described in Example 1, but in 100 kg of a C$_4$-cut which contains 40.6% of n-butane, 32.8% of trans-2-butene, 16.3% of cis-2-butene and 10.3% of 1-butene, in place of the C$_4$-cut employed in Example 1. Per hour, 374 kg of a free-flowing random ethene/1-butene copolymer having the following properties are obtained:

| Viscosity number J | 310 cm$^3$/g |
|---|---|
| MF$_{190/5}$ | 1.0 g/10 min |
| Density | 0.9180 g/cm$^3$ |
| Yield stress | 10 N/mm$^2$ |

-continued

| | |
|---|---|
| Tensile strength | 24 N/mm$^2$ |
| Elongation at break | 817% |
| Ash content | 0.01% |
| IR analysis: CH$_3$/100 C | 2.6 |
| Bulk density | 412 g/l |

If the polymerization is carried out in accordance with the instructions of this example, but with the addition of 1,000 l (S.T.P.) of hydrogen in the first polymerization stage, 2,000 l (S.T.P.) of hydrogen in the second polymerization stage and 2,000 l (S.T.P.) of hydrogen in the third polymerization stage, a random ethene/1-butene copolymer having the following properties is obtained:

| | |
|---|---|
| Viscosity number J | 165 cm$^3$/g |
| MF$_{190/5}$ | 9.2 g/10 min |
| Density | 0.9185 g/cm$^3$ |
| Yield stress | 10 N/mm$^2$ |
| Tensile strength | 15 N/mm$^2$ |
| Elongation at break | 620% |
| Ash content | 0.01% |
| IR analysis: CH$_3$/100 C | 3.2 |
| Bulk density | 416 g/l |

Apart from the molecular weight M$_v$ of 60,000, this product substantially corresponds to a high pressure polyethene.

EXAMPLE 5

The polymerization is carried out in a pressure-resistant 0.25 m$^3$ stirred kettle equipped with level regulation and jacket cooling and circulatory gas cooling, and in a downstream fluidized bed having a reaction space of 2 m$^3$.

In the first stage, the polymerization is carried out in accordance with the instructions of Example 1. The polyethene suspension obtained in the polymerization kettle is introduced continuously, through a bottom slide valve regulated by the level in the kettle, into a fluidized bed having a reaction space of 2 m$^3$. The suspension leaving the polymerization kettle contains 55 kg of polyethene in 45 kg of the C$_4$-cut. In the fluidized bed, the polyethene is fluidized with ethene which is cooled to 25° C., and kept moving, in a circuit comprising a cooler. The polymerization is continued at 80° C. under a pressure of 15 bar. The pressure is kept constant by adding ethene. Per hour, 800 l (S.T.P.) of hydrogen are added to the circulating gas. The C$_4$-hydrocarbons which are partially condensed in the cooler are separated off. The polyethene, which has a residual moisture content of 5%, is discharged via a lock into a fluidization box in which the remaining hydrocarbons are removed by means of nitrogen under normal pressure. Per hour, 204 kg of a free-flowing polyethene having the following properties are obtained:

| | |
|---|---|
| Viscosity number J | 295 cm$^3$/g |
| MF$_{190/5}$ | 1.1 g/10 min |
| Density | 0.960 g/cm$^3$ |
| Yield stress | 29 N/mm$^2$ |
| Tensile strength | 40 N/mm$^2$ |
| Elongation at break | 950% |
| Bulk density | 426 g/l |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A low pressure process for polymerizing ethene, using a Ziegler mixed catalyst, comprising (a) a titanium compound, a vanadium compound or a mixture thereof, and (b) an organo-aluminum compound or a mixture thereof, in multi-stages, comprising:

polymerizing ethene in a first polymerization stage in the liquid phase in suspension using a dispersion medium of a C$_3$- to C$_6$-hydrocarbon up to a catalytic yield of at least 25 kg of polymer per gram of Ti or V catalyst or per gram of Ti catalyst and V catalyst if both are present;

polymerizing, in a last polymerization stage, in the gas phase; and optionally, polymerizing in intermediate stages; all liquid stages preceding the gas stages;

wherein, the polymer-containing dispersion medium resulting from the last liquid stage is directly introduced into the first gas stage.

2. The process of claim 1, which further comprises polymerizing in additional stages between the first and last polymerization stages.

3. The process of claim 1, wherein ethene is polymerized in all stages whereby homopolyethene is produced.

4. The process of claim 1, wherein in addition to ethene, another olefin monomer is polymerized, whereby a random copolymer or a block copolymer of ethene is prepared.

5. The process of claim 1, wherein, in the non-final stages, the heat of polymerization is removed by circulatory gas cooling, evaporative cooling and/or jacket cooling and in the last polymerization stage the residual dispersion medium is evaporated with the aid of the heat of polymerization and is removed.

6. The process of claim 1 or 5, wherein, in the initial polymerization stages, the polymerization is carried out in stirrer kettles, and in the intermediate polymerization stages, is carried out in mixers.

7. The process of claim 5 or 6, wherein the last polymerization stage is carried out in a fluidized bed.

8. The process of claim 1, wherein all the catalyst is added in the first stage.

9. A process for preparing a homopolymer of ethene or a copolymer of ethene with another olefin using a Ziegler mixed catalyst, comprising (a) a titanium compound, a vanadium compound or a mixture thereof, and (b) an organo-aluminum compound or a mixture thereof, which comprises polymerizing in the gas phase using as a starting material the polymer-containing dispersion medium resulting from a liquid phase suspension polymerization of a portion of the desired final homo- or copolymer carried out in a C$_{3-6}$ hydrocarbon medium, the solids content of the polymer-containing dispersion medium being 300–700 g/l.

10. The process of claim 9, which comprises polymerizing in multi-stages; in the initial ones, by polymerizing in the liquid phase in suspension using a dispersion medium of a C$_{3-6}$ hydrocarbon, and in the remaining ones by polymerizing in the gas phase, wherein in the first gas stage the starting material is the polymer-containing dispersion medium resulting from the last liquid stage.

11. The process of claim 9, wherein, in the liquid stages, the polymerization is carried out in a stirred kettle and, in the gas stages, is carried out in a fluidized bed.

* * * * *